INVENTOR
HIROSHI OOKA
BY Cameron, Kerkam & Sutton
ATTORNEYS

Nov. 2, 1971     HIROSHI OOKA     3,616,629
NUT AND FRUIT HARVESTING SYSTEM
Filed Feb. 13, 1970     2 Sheets-Sheet 2
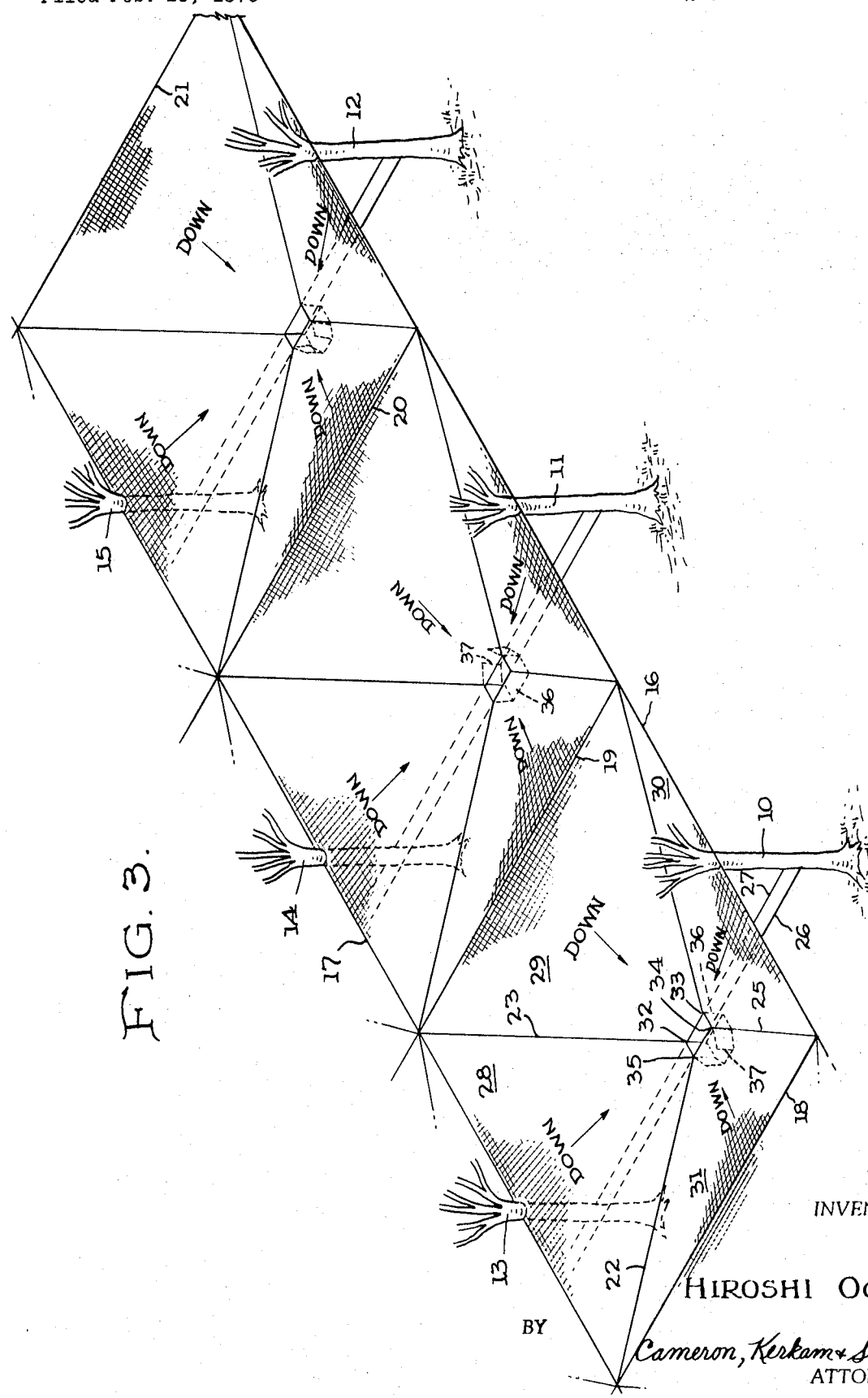
INVENTOR
HIROSHI OOKA
BY
Cameron, Kerkam & Sutton
ATTORNEYS

United States Patent Office 3,616,629
Patented Nov. 2, 1971

3,616,629
NUT AND FRUIT HARVESTING SYSTEM
Hiroshi Ooka, Hilo, Hawaii, assignor to Castle & Cooke, Inc., Honolulu, Hawaii
Filed Feb. 13, 1970, Ser. No. 11,229
Int. Cl. A01g 19/06
U.S. Cl. 56—329                                      7 Claims

ABSTRACT OF THE DISCLOSURE

Nuts and fruit growing on trees planted in rows are harvested by nets mounted on parallel wires extending down the rows of trees. The wires are secured to the trees at heights to allow vehicles to pass thereunder. Net panels slope downwardly toward a point between opposite trees of adjacent rows of trees. A net catchment container is located at the low point of the net panels and receives nuts or fruit dropping from the trees. When full, the container is tipped to discharge its collected contents.

BACKGROUND OF THE INVENTION

The present invention relates to harvesters, fruit gatherers and catchers and more particularly to such harvesters in which nets are permanently mounted between trees in rows of trees at heights to allow vehicles to pass under the trees with net panels sloping to net catchment containers mounted beneath the net panels and disposed to be tipped, when full, to discharge the fallen collected fruit or nuts.

In the prior art nets are used for each tree usually having temporary supports with the fallen fruit discharged at a low point usually around the trunk of the tree. The nets are moved from tree to tree and the tree may be shaken to dislodge the fruit. In at least one recent patent the net is vehicularly mounted for ready transfer from tree to tree. Representative prior art U.S. patents are: 1,410,379 of Mar. 21, 1922; 1,415,863 of May 16, 1922; 1,366,563 of Jan. 25, 1921; 2,519,678 of Aug. 22, 1950; and 3,338,041 of Aug. 29, 1967.

SUMMARY OF THE INVENTION

A net and fruit harvesting system for trees in rows comprises parallel supporting wires for net panels running down each row of trees and secured thereto at heights permitting vehicles to pass under the trees. Cross wires extend between the parallel wires midway between adjacent pairs of trees in each row. Net panels are permanently mounted on the wire frame thus formed and slope to a low point between opposite pairs of trees in adjacent rows of trees. A net catchment container is connected to the net panels at the low point and is supported by parallel wires extending between opposite trees in adjacent rows of trees and, when full, is tipped for discharge and returns to normal position, when released by the resiliency of its wire supports.

It is therefore an object of the present invention to provide a net and fruit harvesting system permanently mounted between rows of trees in which net panels slope downwardly to deflect falling nuts and fruit into a net catchment container which is resiliently mounted so as to be tipped for contents discharge with return to normal position when empty and released.

BRIEF DESCRIPTION OF THE DRAWINGS

In the accompanying drawings, in which like reference characters indicate like parts.

FIG. 3 is a perspective view of the embodiment of FIG. 1 as installed on two parallel rows of trees;

DESCRIPTION OF THE PREFERRED EMBODIMENT

Figure 1:
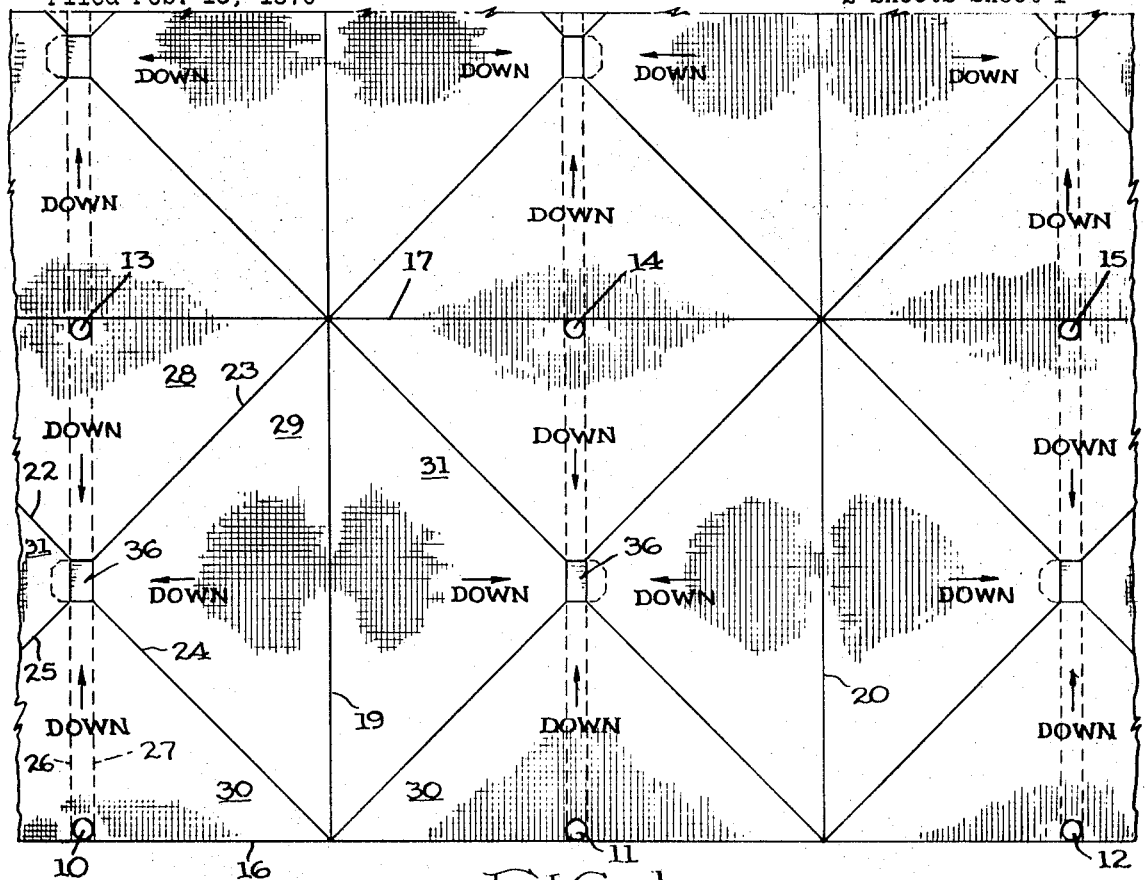
FIG. 1 is a view from above of a preferred embodiment of the nut and fruit harvesting system of the present invention.

Referring now to the drawings and particularly FIG. 3 thereof, trees 10, 11 and 12 of a row of trees are disposed opposite to trees 13, 14 and 15 of the adjacent parallel row of trees. Wire or other suitable resilient non-extensible member 16 is secured to trees 10, 11 and 12 at a height, say eight feet, allowing vehicles to pass thereunder (FIG. 2) with wire 17 parallel thereto and attached to trees 13, 14 and 15 at the same height. Intermediate wires 18, 19, 20 and 21 are secured at right angles to wires 16 and 17 and at points midway between adjacent trees of each row of trees. A wire 26 extends between trees 10 and 13. A wire 27 extends parallel to wire 26 between trees 10 and 13.

New panels 28, 29, 30 and 31 of substantially triangular shape and made of suitable weatherproof materials are secured to the several wires as above-described to form a downwardly directed four-sided net opening at the rectangle 32, 33, 34 and 35 at wires 26 and 27. The net panels join on lines 22, 23, 24 and 25, respectively.

The same arrangement of wires and nets is used for each successive pairs of trees such as trees 11 and 14, 12 and 15 and so on.

Figure 2:
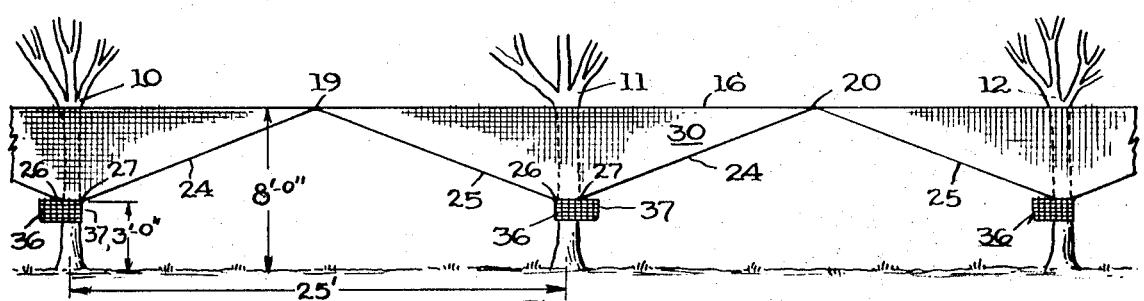
FIG. 2 is a side elevational view of the embodiment of FIG. 1.
Figure 4:
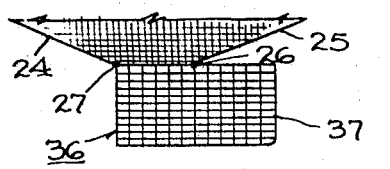
FIG. 4 is an enlarged detail of the embodiment of FIGS. 1–3 showing the net catchment container in nut and fruit receiving position.
Figure 5:
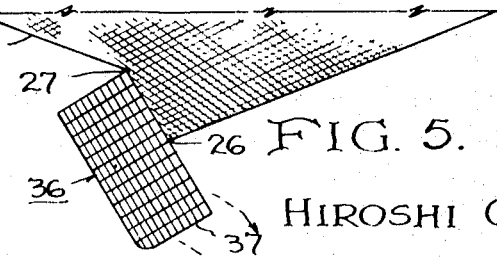
FIG. 5 is a view similar to that of FIG. 4 showing the container tipped for discharge of contents.

A fruit or nut net catchment container 36 of generally rectangular configuration and made of galvanized hardware cloth or other suitable material is mounted on wires 26 and 27 beneath rectangular opening 32, 33, 34 and 35 as seen in FIGS. 4 and 5. The rear end of container 36 is mounted beneath wire 27. Wire 26 supports the container medially and container 36 has extension 37 to form a discharge chute. When nuts or fruit, fallen from the trees and directed by the net panels to container 36 are received therein, container 36 can be tilted downwardly, as seen in FIG. 5, to discharge the collected nuts or fruit. The resilience of wires 26 and 27 permits such tilting and the return of container 36 to normal position when released. Container 36, as seen in FIG. 2 may be approximately three feet from the ground for ready access and extensions 37 are so disposed that they face each other in pairs.

Although the above-described embodiment is for two parallel rows of trees it is obvious that the present collection system can be used for any number of parallel rows of trees and may be extended for any number of trees in a row.

Changes in or modifications to the above-described illustrative embodiment of the present concept may now be suggested to those skilled in the art without departing from the invention. Reference should therefore be had to the appended claims to determine the scope of this inventive concept.

What I claim is:

1. Nut and fruit harvesting system for spaced trees disposed in spaced substantially parallel rows comprising net support means secured to and extending along each row of trees above the ground, intermediate net support means secured across adjacent pairs of said net support means substantially medially spaced between pairs of trees in the rows of trees, a plurality of substantially triangularly shaped net panels each secured along an edge to adjacent ones of said net and said intermediate net support means and extending downwardly toward a point above ground in a line between opposite trees in said rows of trees, a plurality of containers each secured to said net panels adjacent said point for receiving nuts and fruit directed downwardly by said net panels and resilient supports for said container extending between opposite trees in said rows of trees.

2. A system as described in claim 1, said resilient supports comprising spaced parallel resilient non-extensible members supporting an end of said containers and a medial portion of said containers whereby each of said containers may be resiliently tilted to a contents discharge position.

3. A system as described in claim 1, said net support means being resilient non-extensible members.

4. A system as described in claim 1, said net panels being of weatherproof material and said containers being of generally rectangular configuration of hardware cloth.

5. Nut and fruit harvesting system for spaced trees disposed in spaced substantially parallel rows comprising for each tree in a row and the adjacent tree in the adjacent row, net support means secured to and extending along each row of trees above the ground, a plurality of sets, four substantially triangularly shaped net panels permanently supported by said means, each of said sets forming a downwardly directed pyramidal surface extending toward a point above ground in the line between said trees, a plurality of containers each secured to a set of said net panels adjacent said point receiving nuts and fruit from said trees directed downwardly by said net panels and resilient supports for said container extending between said trees.

6. A system as described in claim 5, said resilient supports comprising spaced parallel resilient non-extensible members supporting an end of said container and a medial portion of said container whereby said container may be resiliently tilted to contents discharge position.

7. A system as described in claim 5, said net support means including wires extending along and secured to the trees of each row of trees supporting said net panels.

References Cited

UNITED STATES PATENTS 1,217,137   2/1917   Behrens _____ 56—329

LOUIS G. MANCENE, Primary Examiner

J. Q. LEVER, JR., Assistant Examiner